(12) United States Patent
Reuter et al.

(10) Patent No.: US 11,124,165 B2
(45) Date of Patent: Sep. 21, 2021

(54) PEDAL FREE EMULATOR AND BRAKE-BY-WIRE SYSTEM

(71) Applicant: BWI (Shanghai) Co., Ltd., Shanghai (CN)

(72) Inventors: David Fredrick Reuter, Moraine, OH (US); Dongqiang Luo, Shanghai (CN)

(73) Assignee: BWI (SHANGHAI) CO., LTD., Shanghai (CN)

( * ) Notice: Subject to any disclaimer, the term of this patent is extended or adjusted under 35 U.S.C. 154(b) by 84 days.

(21) Appl. No.: 16/507,438

(22) Filed: Jul. 10, 2019

(65) Prior Publication Data
US 2021/0009098 A1    Jan. 14, 2021

(51) Int. Cl.
*B60T 8/40* (2006.01)
*F16F 3/10* (2006.01)

(52) U.S. Cl.
CPC .............. *B60T 8/409* (2013.01); *F16F 3/10* (2013.01); *B60T 2270/82* (2013.01); *F16F 2224/02* (2013.01); *F16F 2224/025* (2013.01); *F16F 2224/0208* (2013.01); *F16F 2228/066* (2013.01)

(58) Field of Classification Search
CPC ........ B60T 8/409; B60T 11/102; B60T 13/20; B60T 2270/82; F16F 3/10; F16F 2224/0208; F16F 2224/025; F16F 2228/066
See application file for complete search history.

(56) References Cited

U.S. PATENT DOCUMENTS 9,718,448 B2 * 8/2017 Kim ..................... B60T 8/409
2008/0223670 A1 * 9/2008 Toyohira ............... B60T 8/4081
188/152

(Continued)

FOREIGN PATENT DOCUMENTS

CN    203460854 U    3/2014
CN    103818361 B    5/2014

(Continued)

OTHER PUBLICATIONS

Second Office Action dated Sep. 14, 2020 for counterpart Chinese patent application No. 201910688386.2, along with machine EN translation downloaded from EPO.

(Continued)

*Primary Examiner* — Vishal R Sahni
(74) *Attorney, Agent, or Firm* — William H. Honaker; Dickinson Wright PLLC

(57) ABSTRACT

A pedal feel emulator includes: a body; a displacement piston provided inside the body, the displacement piston being movable along an axial direction of the body, the displacement piston has a hollow part at lower part, and the hollow part is surrounded by a surrounding wall; a retainer provided fixed inside the body, the retainer being under the displacement piston; a first elastic object provided between the displacement piston and the retainer, the first elastic object being retained by the retainer; and a second elastic object provided inside the hollow part of the displacement piston, an air gap is provided between bottom surface of the second elastic object and top surface of the retainer. A brake-by-wire system including the pedal feel emulator is also disclosed herein.

10 Claims, 4 Drawing Sheets

(56) References Cited

U.S. PATENT DOCUMENTS

| | | | | |
|---|---|---|---|---|
| 2012/0103452 | A1* | 5/2012 | Toyohira | F15B 7/08 |
| | | | | 138/31 |
| 2014/0069093 | A1* | 3/2014 | Kim | B60T 11/102 |
| | | | | 60/553 |
| 2014/0360177 | A1* | 12/2014 | Ryu | G05G 5/03 |
| | | | | 60/556 |
| 2019/0092307 | A1* | 3/2019 | Kim | B60T 17/22 |
| 2020/0324749 | A1* | 10/2020 | Li | B60T 13/662 |

FOREIGN PATENT DOCUMENTS

| | | |
|---|---|---|
| CN | 103991440 A | 8/2014 |
| CN | 103991440 B | 8/2014 |
| CN | 104228790 A | 12/2014 |
| CN | 204567627 U | 8/2015 |
| CN | 205220643 U | 5/2016 |
| CN | 107914680 A | 4/2018 |
| CN | 207416806 U | 5/2018 |
| CN | 207550177 U | 6/2018 |
| KR | 10-2018-0094274 A | 8/2018 |

OTHER PUBLICATIONS

First Office Action and search report dated Apr. 13, 2020 for counterpart Chinese patent application No. 201910688386.2, along with machine EN translation downloaded from EPO.
Decision of Rejection dated Feb. 19, 2021 for counterpart Chinese patent application No. 201910688386.2, along with EN machine translation.

* cited by examiner

PEDAL FREE EMULATOR AND BRAKE-BY-WIRE SYSTEM

TECHNICAL FIELD

The present disclosure relates to a pedal feel emulator for a brake-by-wire system and a brake-by-wire system.

BACKGROUND

Conventional braking systems of a vehicle include mechanical and/or hydraulic braking systems that provide direct mechanical linkages and/or hydraulic force-transmitting-paths between a driver and brake control units of the vehicle. A direct application of pedal-to-brake force is utilized in conventional braking systems. Drivers have become accustomed to the pedal response or "feel" generated by such systems.

With brake-by-wire or similar type of vehicle braking system, the application of braking force to the wheel brake is generated by an electric or an electrohydraulic controlled means. Pedal feel emulator is needed in brake-by-wire system to emulate pedal feel that drivers are accustomed.

There are now numerous pedal feel emulators on the market. It was found by the inventors that most of the pedal feel emulators include a number of components. Specific designed structures are needed in some cases, for example, the structures may be threaded caps with extra guides and seals, etc. Therefore, the cost and complexity of the pedal feel emulator are relatively high. It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY OF THE DISCLOSURE

The present disclosure provides a pedal feel emulator and a brake-by-wire system. The pedal feel emulator utilizes a hollow part of a piston to accommodate a second elastic object, so that the volume of the pedal feel emulator is reduced, and the cost and complexity of structure is lower.

It is one aspect of the present disclosure to provide a pedal feel emulator. The pedal feel emulator includes:

a body;

a displacement piston provided inside the body, the displacement piston being movable along an axial direction of the body, wherein, the displacement piston has a hollow part at a lower part and the hollow part is surrounded by a surrounding wall;

a retainer fixed inside the body, the retainer being provided under the displacement piston;

a first elastic object provided between the displacement piston and the retainer, the first elastic object being retained by the retainer; and a second elastic object provided inside the hollow part of the displacement piston, wherein, an air gap is provided between a bottom surface of the second elastic object and a top surface of the retainer.

According to an embodiment of the present disclosure, the surrounding wall overlaps with an upper part of a side wall of the retainer along a radial direction.

According to an embodiment of the present disclosure, a first step portion is provided on a side wall of the retainer, an outside diameter of the first step portion is larger than an inside diameter of the surrounding wall, a distance between a bottom end of the surrounding wall and the first step portion is larger than a dimension of the air gap along the axial direction.

According to an embodiment of the present disclosure, a second step portion is provided on a lower part of side wall of the retainer, an outside diameter of the second step is larger than an outside diameter of the first step portion, an end of the first elastic object is attached to the second step portion, the other end of the first elastic object is attached to the surrounding wall.

According to an embodiment of the present disclosure, an outer rim of the second step portion is embedded in an inner wall of the body.

According to an embodiment of the present disclosure, the second elastic object is attached to a bore of the surrounding wall via at least a protrusion portion.

According to an embodiment of the present disclosure, the first elastic object is a steel spring, the second elastic object is made of rubber.

According to an embodiment of the present disclosure, the upper part of the hollow part includes a first contact surface and a first sloping surface, the upper part of the second elastic object includes a second contact surface and a second sloping surface, the first contact surface and the second contact surface contact with each other.

According to an embodiment of the present disclosure, when a bottom surface of the second elastic object presses a top surface of the retainer, a relationship between a force applied on the displacement piston and a displacement of the displacement piston is determined by at least one of the following factors:

a first angle between the first sloping surface and the axial direction;

a second angle between the second sloping surface and the axial direction; and a diameter of the hollow part.

According to an embodiment of the present disclosure, a radius of the outer rim of the top surface of the retainer is smaller than a predetermined value.

It is another aspect of the present disclosure to provide a brake-by-wire system. The brake-by-wire system includes the pedal feel emulator according to any one of above mentioned embodiments.

An advantage of the embodiments of the present disclosure exists in that the volume of the pedal feel emulator is reduced, and the cost and complexity of structure is lowered.

With reference to the following description and drawings, the particular embodiments of the present disclosure are disclosed in detail, and the principle of the present disclosure and the manners of use are indicated. It should be understood that the scope of the embodiments of the present disclosure are not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including/" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiment of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Furthermore, in the following description of this disclosure, for the sake of convenience of explanation, a direction of radius taking a central axis C of a chamber of a body as a center is referred to as "a radial direction", a direction of a circumference taking the central axis as a center is referred to as "a circumferential direction", a direction along a direction of the central axis is referred to as "an axial direction", a direction of the "axial direction" pointing from a retainer to a second elastic object is referred to as "an upward direction", and a direction opposite to the "upward direction" is referred to as "a downward direction".

Figure 1:
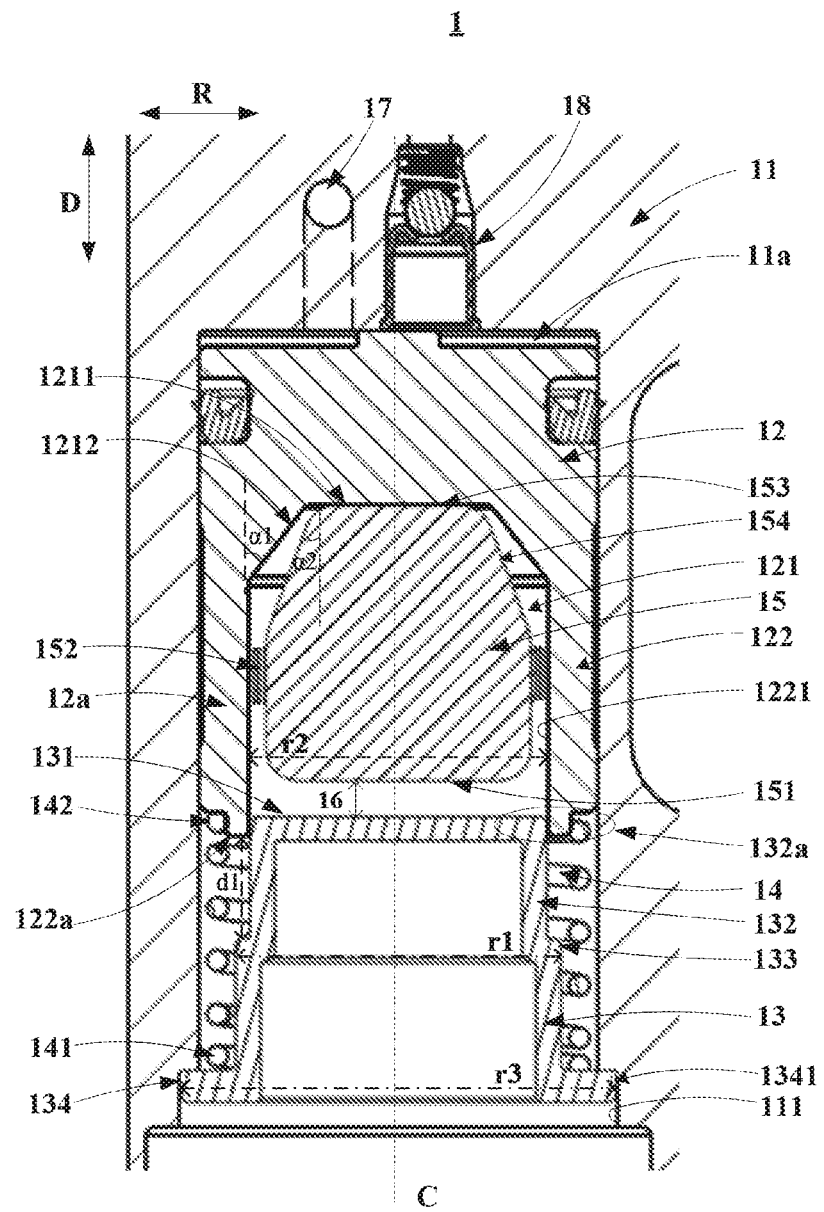
FIG. 1 is an axial cross-sectional view of a pedal feel emulator in accordance with one embodiment of the present disclosure.

A first aspect of embodiments:

Embodiments of this disclosure provide a pedal feel emulator. The pedal feel emulator constructed in accordance with one embodiment of the present disclosure is generally shown in FIG. 1. The pedal feel emulator 1 includes a body 11, a displacement piston 12, a retainer 13, a first elastic object 14 and a second elastic object 15.

In some embodiments, the body 11 defines a chamber 11a. The displacement piston 12, the retainer 13, the first elastic object 14 and the second elastic object 15 are accommodated in the chamber 11a. In some examples, the chamber 11a is in a cylindrical shape.

In some embodiments, the displacement piston 12 is arranged inside the body 11, i.e., accommodated in the chamber 11a. The displacement piston 12 is movable along an axial direction D of the body 11.

As shown in FIG. 1, the displacement piston 12 has a hollow part 121 at a lower part 12a. In some examples, the hollow part 121 is surrounded by a surrounding wall 122.

In some embodiments, the retainer 13 is located inside the chamber 11a and coupled to the body 11. For example, the retainer 13 can be arranged under the displacement piston 12.

As shown in FIG. 1, in some embodiments, the first elastic object 14 is located between the displacement piston 12 and the retainer 13 and is retained in the chamber 11a by the retainer 13.

As shown in FIG. 1, in some embodiments, the second elastic object 15 is located inside the hollow part 121 of the displacement piston 12.

The second elastic object 15 is attached to a bore 1221 of the surrounding wall 122, so that the second elastic object 15 is movable together with the displacement piston 12 along the axial direction D before contacting with the retainer 13.

In some embodiments, an air gap 16 is formed between a bottom surface 151 of the second elastic object 15 and a top surface 131 of the retainer 13 before the second elastic object 15 contacts with the retainer 13.

In some embodiments, when the displacement piston 12 moves along a downward direction from a highest position in the chamber 11a, the first elastic object 14 is pressed by the displacement piston 12, and the air gap 16 narrows. Thus, a first stage of pedal feel emulation is realized by a force of the first elastic 14.

When the air gap 16 becomes zero, i.e. the second elastic object 15 contacts with the retainer 13, the second elastic object 15 starts to be compressed, and if the displacement piston 12 continues to move downward, the second elastic object 15 and the first elastic 14 together provide forces to realize a second stage of pedal feel emulation. Therefore, the pedal feel emulator 1 provides two-stage pedal feel emulation.

According to the embodiments of this disclosure, the second elastic object 15 is arranged inside the hollow part 121 of the piston 12 to reduce the volume of the pedal feel emulator 1 thereby also reducing the additional components which lowers the cost and complexity of the pedal feel emulator 1.

In some embodiments, when the displacement piston 12 is at the highest position in the chamber 11a, the surrounding wall 122 overlaps with an upper part of a side wall 132 of the retainer 13 along a radial direction R. The overlapping parts are indicated in a circle 132a with dotted line in FIG. 1. The sidewall 132 of the retainer 13 guides the displacement piston 12 when the displacement piston 12 moves downward and upward. Therefore, additional guiding components are not necessary thereby lowering the cost and complexity of the pedal feel emulator 1.

As shown in FIG. 1, in some embodiments, a first step portion 133 is provided on the sidewall 132 of the retainer 13. An outside diameter r1 of the first step portion 133 is larger than an inside diameter r2 of the surrounding wall 122. A distance d1 between a bottom end 122a of the surrounding wall 122 and the first step portion 133 is larger than the dimension of the air gap 16 along the axial direction D.

When the displacement piston 12 moves downward until the bottom end 122a of the surrounding wall 122 and meets the first step portion 133, movement of the displacement piston 12 is stopped by the first step portion 133. Therefore, over stressing the first elastic object 14 is prevented by the first step portion 133 prolonging the operation life of the first elastic object 14.

As shown in FIG. 1, in some embodiments, a second step portion 134 is provided on a lower part of the sidewall 132 of the retainer 13. An outside diameter r3 of the second step portion 134 is larger than the outside diameter r1 of the first step portion 133, and the second step portion 134 forms a flange at a bottom of the retainer 13. One end 141 of the first elastic object 14 is attached to the second step portion 134; the other end 142 of the first elastic object 14 is attached to the surrounding wall 122. Therefore, the first elastic object 14 is attached to the retainer 13 at a low cost.

As shown in FIG. 1, in some embodiments, the outer rim 1341 of the second step portion 134 is embedded in the inner wall 111 of the body 11, so that the retainer 13 is arranged in the chamber 11a at a low cost.

As shown in FIG. 1, in some embodiments, the second elastic object 15 is attached to a bore 1221 of the surrounding wall 122 via at least a protrusion portion 152. The protrusion portion 152 extends outwardly from the second elastic object 15 along the radial direction R, and slightly presses the bore 1221 to stabilize the second elastic object 15 in the bore 1221.

In some embodiments, the first elastic object 14 is a steel spring. The second elastic object 15 is made of rubber. For example, the second elastic object 15 can be made from an elastomeric material. It should be appreciated that this disclosure is not limited thereto, the first elastic object 14 and the second elastic object 15 may be of other types.

In some embodiments, where a lighter force is desired, the first stage of pedal feel can be tuned by a stiffness of the first elastic object 14 and/or the size of the air gap 16.

In some embodiments, the upper part of the hollow part 121 includes a first contact surface 1211 and a first sloping surface 1212. The first sloping surface 1212 is arranged around the first contact surface 1211 in the radial direction R.

In some embodiments, the upper part of the second elastic object 15 includes a second contact surface 153 and a second sloping surface 154. The second sloping surface 154 is arranged around the second contact surface 153 in the radial direction R.

As shown in FIG. 1, in some embodiments, the first contact surface 1211 and the second contact surface 151 contacts with each other thereby allowing the displacement piston 12 to press against the second elastic object 15.

When the bottom surface 151 of the second elastic object 15 presses against the top surface 131 of the retainer 13, a relationship between a force F applied on the displacement piston 12 and a displacement of the displacement piston 12 can be determined from at least one of the following factors: a first angle $\alpha 1$ between the first sloping surface 1212 and the axial direction D, a second angle $\alpha 2$ between the second sloping surface 154 and the axial direction D, the diameter r2 of the hollow part 121 (i.e., the inside diameter r2 of the surrounding wall 122, or a diameter of the bore 1221).

In some embodiments, the second elastic object 15 (a rubber spring or an elastomer) deforms when pressed; and the deformed second elastic object 15 contacts with the first sloping surface 1212. The first angle $\alpha 1$ affects a first force f1 applied on the second elastic object 15 along the axial direction D, as well as a second force f2 applied on the second elastic object 15 along the radial direction R. The first force f1 and the second force f2 change as the first angle $\alpha 1$ changes.

Figure 2:
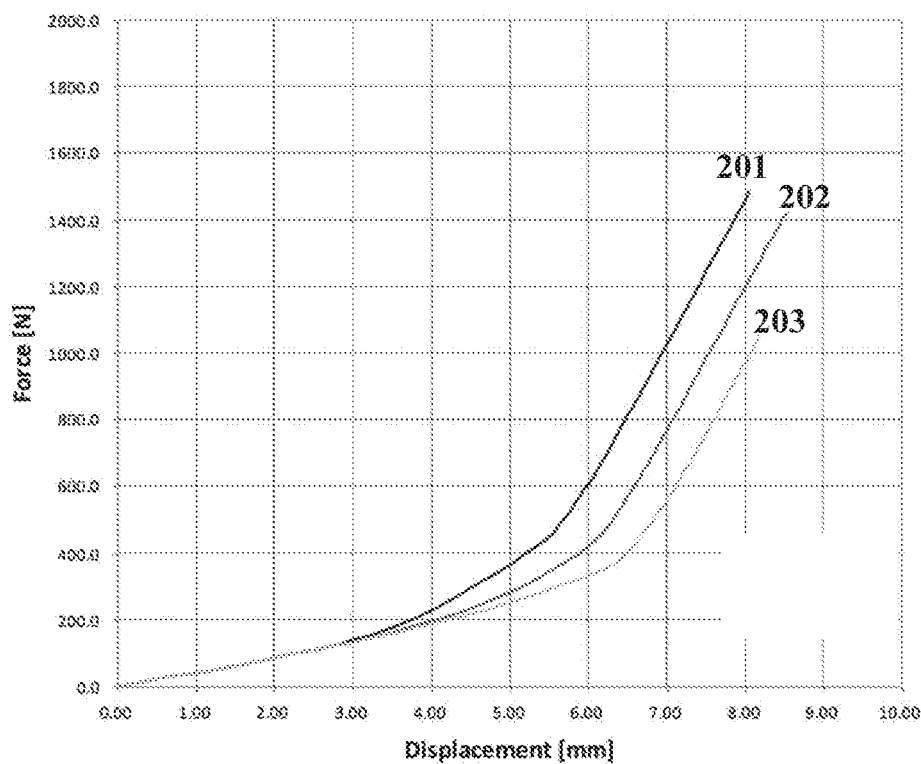
FIG. 2 is a graphical illustration showing a relationship between a force applied on a displacement piston and a displacement of the displacement piston for different first angles.

FIG. 2 shows the relationship between a force F applied on the displacement piston 12 and a displacement of the displacement piston 12 for different first angles $\alpha 1$. Lines 201, 202, 203 represent the relationship between the force F and the displacement for $\alpha 1=30°$, $\alpha 1=36.85°$, $\alpha 1=45°$, respectively.

In some embodiments, the second elastic object 15 (a rubber spring or an elastomer) deforms not only along the axial direction D but also along the radial direction R when pressed. For example, when pressing a force applied on the second elastic object 15 is along the axial direction D, the second elastic object 15 becomes shorter along the axial direction D and wider along the radial direction R. The bore 1221 of the surrounding wall 122 restrains the deformation along the radial direction R of the second elastic object 15. Thus, the diameter r2 of the hollow part 121 affects the deformation of the second elastic object 15.

Figure 3:
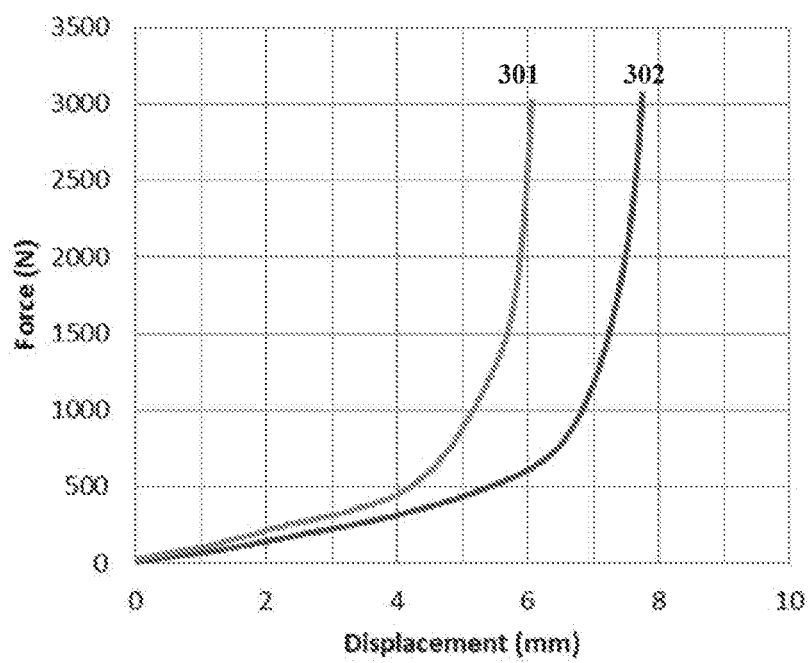
FIG. 3 is a graphical illustration showing a relationship between a force applied on the displacement piston and a displacement of the displacement piston for different diameters.

FIG. 3 shows the relationship between a force F applied on the displacement piston 12 and a displacement of the displacement piston 12 for different diameters r2. As shown in FIG. 3, line 301, 302 represent the relationship between the force F and the displacement for r2=19 mm, r2=21 mm, respectively.

In some embodiments, the second angle $\alpha 2$ defines a shape and flexibility of the second elastic object 15. Thus, the second angle $\alpha 2$ affects the deformation of the second elastic object 15.

In some embodiments, at least one of the first angle $\alpha 1$, the second angle $\alpha 2$ and the diameter r2 is designed to get a desired relationship between the force F and the displacement of displacement piston 12 to realize the second stage of pedal feel emulation.

Figure 4:
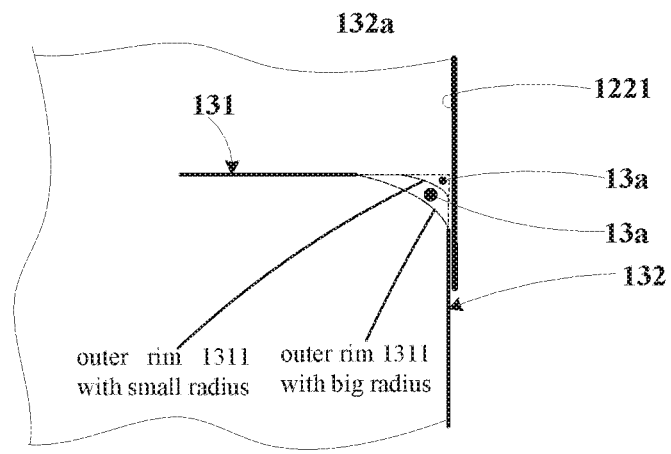
FIG. 4 is enlarged view near an outer rim of a top surface of a retainer.

As shown in FIG. 4, regarding the part in a circle 132a with dotted line in FIG. 1, if the outer rim 1311 of the top surface 1311 of the retainer 13 has a bigger radius, more of the second elastic object 15 can be pressed into a space 13a between the outer rim 1311 and the bore 1221. Accordingly, this produces excessive deformation thereby reducing the operation life of the pedal feel emulator 1.

In some embodiments, the radius of the outer rim 1311 of the top surface 131 of the retainer 13 is smaller than a predetermined value. Accordingly, less part of the second elastic object 15 can be pressed into the space between the outer rim 1311 and the bore 1221, thereby prolonging a life time of the second elastic object 15.

In some embodiments, as shown in FIG. 1, the pedal feel emulator 1 further includes a first valve 17 and a second valve 18 assembled to the body 11. In some examples, the first valve 17 can be a bi-directional valve, and/or, the second valve 18 is a one-way valve.

When a brake force is needed, fluid may flow into the chamber 11a through the first valve 17 and apply the force F on the displacement piston 12. When a brake force is not needed, the first elastic object 14 and/or the second elastic object 15 push the displacement piston 12 upward, the fluid may flow out through the first valve 17 and the second valve 18.

In some embodiments, the second valve 18 is deep drawn. The second valve 18 also is reused from an ABS system (antilock brake system) to save cost.

As shown in FIG. 1, in some embodiments, the pedal feel emulator 1 further includes a sealing portion 18 between the displacement piston 12 and the body 11.

In some embodiments, the displacement piston 12 can be manufactured in aluminum or other material using standard lathe processes or in plastic for higher volume applications. For example, the displacement piston 12 can be made on a screw machine or from molded plastic, depending upon economic analysis.

In some embodiments, the retainer 13 is manufactured by a conventional machining process for low volume, low investment applications, or may be deep drawn for low piece price when higher volumes are required.

According to the embodiments of this disclosure, the low cost, manufacturable, two-stage pedal feel emulator 1 is provided.

Figure 5:
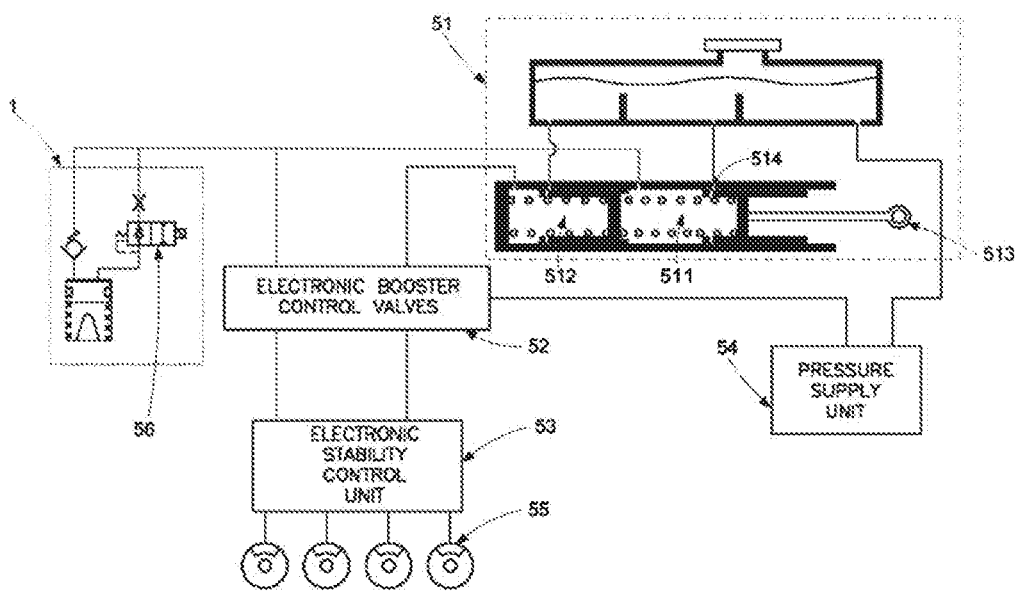
FIG. 5 is a diagram of a brake-by-wire system in accordance with one embodiment of the present disclosure.

A second aspect of embodiments:

It is another aspect of the present disclosure to provide a brake-by-wire system. The brake by wire system, constructed in accordance with one embodiment of the present disclosure, is generally shown in FIG. 5. The brake-by-wire system 5 includes a pedal feel emulator 1, a master cylinder 51, electronic booster control valves 52, an electronic stability control unit 53 and a pressure supply unit 54. In some embodiments, the pedal feel emulator 1 has been described in the first aspect of embodiments.

As shown in FIG. 5, in some embodiments, the master cylinder 51 includes a primary circuit 511, a secondary circuit 512 and a primary piston 513. The primary piston 513 serves as an actuator for the pedal feel emulator 1 when a pedal feel emulator valve (PFEV) 56 is opened. The PFEV 56 corresponds to the first valve 17 in FIG. 1.

Alternatively, if fluid in primary circuit 511 is lost, the PFEV is shut and pressure from the master cylinder 51 admits to wheel brakes 55 via the electronic stability control unit 53. There are adequate electronic booster control valves 52 to take care of all related safety functions, such as diagnosing a malfunctioning primary piston, a failed hydraulic circuit, etc.

In some embodiments, when a pedal force is applied on the primary piston 513, travel of the primary piston 513 includes 3 stages. A first stage corresponds to the travel of the primary piston 513 to close a bypass hole 514 of the master cylinder 51. A second stage corresponds to the air gap 16 of the pedal feel emulator 1, and the travel of primary piston 513 in the second stage generates the first stage of pedal feel emulation described in the first aspect of embodiments. A third stage corresponds to the deformation of the second elastic object 15 in the pedal feel emulator 1, and the travel of primary piston 513 in the third stage generates the second stage of pedal feel emulation described in the first aspect of embodiments.

Figure 6:
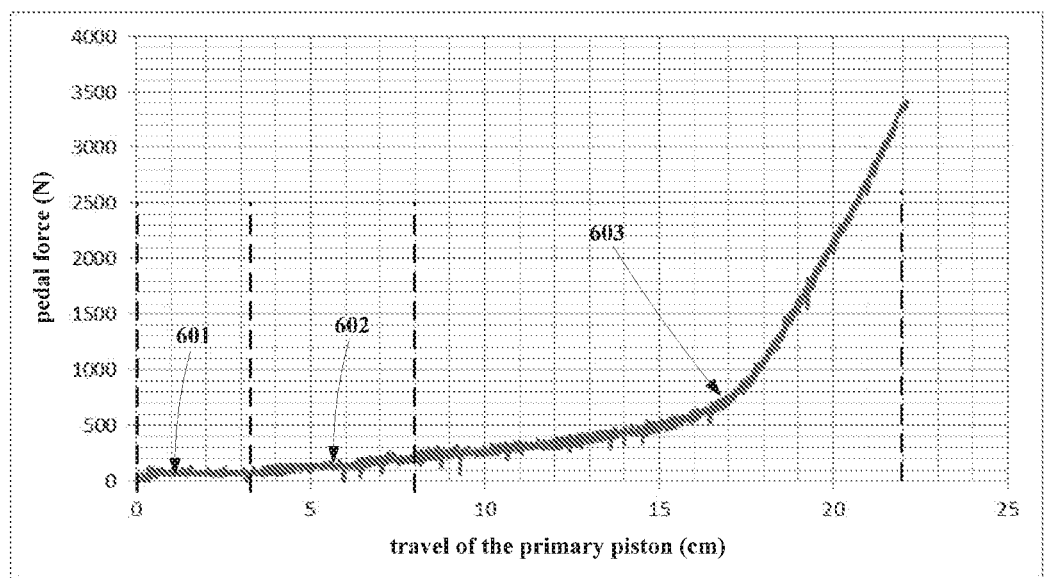
FIG. 6 is a graphical illustration showing a relationship between a travel of a primary piston and a pedal force applied on the primary piston.

FIG. 6 is a diagram of a relationship between the travel of the primary piston and the pedal force applied on the primary piston 513. As shown in FIG. 6, a line 600 is divided into 3 parts. A first part 601 corresponds to the first stage of travel. The second part 602 corresponds to the second stage of travel, in which the first stage of pedal feel emulation is generated. The third part 603 corresponds to the third stage of travel, in which the second stage of pedal feel emulation is generated.

For example, at normal boost, an initial stage of pedal feel emulation is tuned by travel to close the bypass hole 514, and the stiffness of the first elastic object 14 and/or the size of the air gap 16.

In the event of a failure at boost, pressure in the master cylinder 51 is generated after the bypass hole 514 is closed. Thus, the travel loss is only contributed by the first stage of travel. This is shorter travel loss advantage.

On the contrary, if the air gap 16 is not designed in the pedal feel emulator 1, to meet the same pedal feel emulation at the normal boost as shown in FIG. 6, the travel to close the bypass hole 514 have to be longer, then in failed of boost, the travel loss is very long to generate the pressure in the master cylinder 51.

Therefore, reliability of the brake-by-wire system 5 in the embodiments is strengthened.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. A pedal feel emulator, comprising:
   a body;
   a displacement piston disposed in the body and movable along an axial direction, wherein, a lower part of the displacement piston defines a hollow part and the hollow part is surrounded by a surrounding wall;
   a retainer disposed in the body and located under the displacement piston;
   a first elastic object disposed between the displacement piston and the retainer and retained by the retainer; and
   a second elastic object disposed inside the hollow part of the displacement piston and spaced from the retainer and defining an air gap extending between a bottom surface of the second elastic object and a top surface of the retainer;
   wherein an upper end of the first elastic object is attached to the outer circumference of a lower end of the surrounding wall,
   wherein the pedal feel emulator further comprises:
      a first step portion is provided on a side wall of the retainer,
      an outside diameter of the first step portion being larger than an inside diameter of the surrounding wall, and
      a distance between a bottom end of the surrounding wall and the first step portion being larger than the dimension of the air gap along the axial direction.

2. The pedal feel emulator according to claim 1, wherein the surrounding wall overlaps with an upper part of a side wall of the retainer along a radial direction.

3. The pedal feel emulator according to claim 1 further including:
   a second step portion is provided on a lower part of a side wall of the retainer,
   an outside diameter of the second step portion being larger than the outside diameter of the first step portion,
   one end of the first elastic object being attached to the second step portion, and the other end of the first elastic object being attached to the surrounding wall.

4. The pedal feel emulator according to claim 3, wherein an outer rim of the second step is embedded in an inner wall of the body.

5. The pedal feel emulator according to claim 1, wherein the second elastic object is attached to a bore of the surrounding wall via at least a protrusion portion.

6. The pedal feel emulator according to claim 1, wherein the first elastic object is a steel spring and the second elastic object is made of rubber.

7. The pedal feel emulator according to claim 6, wherein an upper part of the hollow part comprises a first contact surface and a first sloping surface, and an upper part of the second elastic object comprises a second contact surface and a second sloping surface, the first contact surface and the second contacting surface contact with each other.

8. The pedal feel emulator according to claim 7, wherein, when a bottom surface of the second elastic object presses a top surface of the retainer, a relationship between a force applied on the displacement piston and a displacement of the displacement piston is determined by at least one of the following factors:

a first angle between the first sloping surface and the axial direction;

a second angle between the second sloping surface and the axial direction; and a diameter of the hollow part.

9. The pedal feel emulator according to claim 6, wherein a radius of an outer rim of the top surface of the retainer is smaller than a predetermined value.

10. A brake-by-wire system, comprising a pedal feel emulator, the pedal feel emulator comprising:

a body;

a displacement piston disposed in the body and movable along an axial direction, wherein, a lower part of the displacement piston defines a hollow part and the hollow part is surrounded by a surrounding wall;

a retainer disposed in the body and located under the displacement piston;

a first elastic object located between the displacement piston and the retainer and retained by the retainer; and a second elastic object disposed in the hollow part of the displacement piston and spaced from the retainer and defining an air gap extending between a bottom surface of the second elastic object and a top surface of the retainer;

wherein an upper end of the first elastic object is attached to the outer circumference of a lower end of the surrounding wall, wherein the pedal feel emulator further comprises:

a first step portion is provided on a side wall of the retainer, an outside diameter of the first step portion being larger than an inside diameter of the surrounding wall, and a distance between a bottom end of the surrounding wall and the first step portion being larger than the dimension of the air gap along the axial direction.

* * * * *